(12) United States Patent
Aggarwal et al.

(10) Patent No.: US 6,408,293 B1
(45) Date of Patent: Jun. 18, 2002

(54) INTERACTIVE FRAMEWORK FOR UNDERSTANDING USER'S PERCEPTION OF MULTIMEDIA DATA

(75) Inventors: Gaurav Aggarwal; Pradeep Kumar Dubey; Sugata Ghosal; Ashutosh Kulshreshtha, all of New Delhi; Tumkur Venkatanarayana Rao Ravi, Bangalore, all of (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/328,968

(22) Filed: Jun. 9, 1999

(51) Int. Cl.[7] .............................................. G06F 17/30
(52) U.S. Cl. ............................. 707/3; 707/5; 707/102
(58) Field of Search ............................ 707/104, 6, 3, 707/5, 2; 382/170, 284, 217

(56) References Cited

U.S. PATENT DOCUMENTS

| | | | | | |
|---|---|---|---|---|---|
| 5,802,361 | A | * | 9/1998 | Wang et al. ................. | 382/217 |
| 5,893,095 | A | * | 4/1999 | Jain et al. ........................ | 707/6 |
| 5,899,999 | A | * | 5/1999 | De Bonet .................... | 707/104 |
| 5,913,205 | A | * | 6/1999 | Jain et al. ....................... | 707/2 |
| 6,181,818 | B1 | * | 1/2001 | Sato et al. .................... | 382/170 |
| 6,246,804 | B1 | * | 6/2001 | Sato et al. .................... | 382/284 |

OTHER PUBLICATIONS

J.R. Smith and S.F. Chung, "Visual Seek: A fully automated content–based image query system", *Proc. ACM Multimedia 96*, 1996.

W.Y. Ma and B.S. Manjunath, "NeTra: A Toolbox for Navigating Large Image Databases", *Proc. IEEE Int. Conf. On Image Processing*, 1997, pp. 568–571.

Y. Rui et al., "Relevance Feedback: A Power Tool for Interactive Content–Based Image Retrieval", *IEEE Trans. Circuits and Systems for Video Technology, Special Issue on Interactive Multimedia Systems for the Internet*, 1998, pp. 1–13.

C. Nastar et al., "Efficient Query Refinement for Image Retrieval", *Proc. IEEE CVPR*, 1998.

T.P. Minka and R.W. Picard, "Interactive Learning with a 'Society of Models'", *Proc. IEEE CVPR*, 1996, pp. 447–452.

C. Carson et al., "Region–Based Image Querying", *CVPR '97 Workshop on Content–Based Access of Image and Video Libraries*, Puerto Rico, Jun. 1997, pp. 1–8.

\* cited by examiner

*Primary Examiner*—Diane D. Mizrahi
(74) *Attorney, Agent, or Firm*—Whitham, Curtis & Christofferson, P.C.; T. Rao Coca (57) ABSTRACT

A methodology of highly interactive intra-object relevance feedback is used to retrieve multimedia data from a database. The query object could consist of one or more images, images derived from video, a video sequence, or an audio clip. The query is adjusted using the information fed-back by the user about the relevance of previously extracted part(s) from the object itself, such that the adjusted query is a better approximation to the user's perception. The information fed-back by the user during intra-query modification is used for intra-object learning of the user's perception. The refined query is subsequently used for inter-object relevance feedback where data is retrieved from the database based on parameters learnt by intra-query object feedback mechanism, and the user provides feedback by ranking the retrieved objects in order of their relevance to him or her. In the system according to the invention, inter-object learning of user's perception is expedited by utilizing the learnt parameters in the intra-object relevance feedback. Furthermore, the methodology of the invention allows for building refined queries based on part(s) or sub-sequence(s) of the query object rather than the entire object itself, thereby reducing the number of irrelevant objects, retrieved from the database. The methodology allows synthesis and modification of the input query object itself in the event a query object is not directly available, and, also to learn the user's perception.

9 Claims, 6 Drawing Sheets

INTERACTIVE FRAMEWORK FOR UNDERSTANDING USER'S PERCEPTION OF MULTIMEDIA DATA

BACKGROUND OF THE INVENTION

1. Field of the Invention

The present invention generally relates to retrieval of multimedia data (images, video and audio) from a database and, more particularly, to a system which understands the user's perception from the query object(s) itself via user interaction, thereby increasing the relevance of the data retrieved from the database, and subsequently increasing the speed of retrieval of the objects of interest.

2. Background Description

Effective utilization of rapidly growing collection of digital images, audio and video necessitates the development of efficient content-based query and retrieval methods. Traditional content-based image retrieval (CBIR) methods primarily focused on finding the "best" representations for the image-centric visual features (e.g., color, texture, shape). During the retrieval process, the user specifies weights to different visual features, and a retrieval system finds similar images to the user's query based on specified weights. See J. R. Smith and S. F. Chung, "Visual seek: A fully automated content based image query system", *Proc. ACM Multimedia 96*, 1996, and W. Y. Ma and B. S. Manjunath, "Netra: A toolbox for navigating large image databases", *Proc. IEEE Int. Conf. on Image Processing*, 1997.

Performance of such a computer-centric retrieval paradigm is not satisfactory (i.e., number of images irrelevant to the user is large), essentially due to the gap between high-level concepts (i.e., user's actual intention) and low-level visual features, and the inherent subjectivity of human perception. On the other hand, in emerging relevance feedback based approach to CBIR, the retrieval process is interactive between the computer and the user. Based on the initial query image, the computer returns a set of similar images from the database. The user assigns relevance to the retrieved images (from highly relevant to irrelevant). The computer tries to correlate the user's perception of the image in terms of the low-level features, typically by employing some machine learning techniques. It then performs the retrieval process again. This interactive process is repeated until the user finds the image of interest. See Y. Rui, Thomas S. Hung, M. Ortega and S. Mehrotra, "Relevence Feedback: A powertool in interactive content based image retrieval", *IEEE Trans. Circuits and Systems for Video Technology, Special Issue on Interactive Multimedia Systems for The Internet*, 1998, and C. Nastar, M. Mitschke, C. Meilhac, "Efficient Query Refinement for Image Retrieval", *Proc. IEEE CVPR*, 1998. This process of repeatedly searching the database can become a bottleneck with the increase in database size and the number of users.

Due to subjectivity in human perception, irrelevant images are frequently retrieved from an image database, given a query by the user. Existing relevance feedback techniques repeatedly search the database which can be remotely located, and understand the user's perception by downloading relevant and irrelevant images to the user in each search. This repeated database search and download slows down the retrieval speed of the image of interest.

SUMMARY OF THE INVENTION

It is therefore an object of the present invention to provide an understanding of the user's perception from the query object(s) itself via user interaction, thereby increasing the relevance of the multimedia objects retrieved from the database, and subsequently increasing the speed of retrieval of the object of interest. The query can consist of any of the following: an image, an image set, image(s) derived from a video sequence, a video sequence or an audio clip. Although we describe the invention in detail for image retrieval, we provide sufficient examples for video and audio such that anyone skilled in the art can use the same techniques for general media queries.

In this invention, we present a new methodology which incorporates interactive intra-query object relevance feedback and learning to understand the user's perception about the query object. The query is adjusted using the feedback given by the user about the relevance of previously extracted part(s) from the query object itself, such that the adjusted query is a better approximation to the user's perception. Since a single query object is utilized in the system according to the invention, high-performance learning techniques, which are often computationally intensive, can be employed for this intra-query object learning of user's perception. The refined query can be subsequently used using prior-art techniques for inter-query object relevance feedback where data is retrieved from the database based on parameters learned by intra-query object feedback mechanism, and the user provides feedback by ranking the retrieved data in order of their relevance to her/him. In the system according to the invention, inter-query object learning of user's perception is expedited by utilizing the learned parameters in the intra-query object relevance feedback. Furthermore, the methodology of the invention allows for building refined queries based on part(s) of the query object rather than the entire object itself, thereby reducing irrelevant data being retrieved from the database. Also, unlike existing systems where the query object(s) is restricted to the set of database objects, there is no such restriction in the system according to the invention. In addition, the present invention allows the user to synthesize/modify the query object(s) starting from a textual query or from a set of dictionary objects; e.g., using a "drag-and-drop" approach. The user's action during the synthesis and modification process is further used to learn his or her perception of the image.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
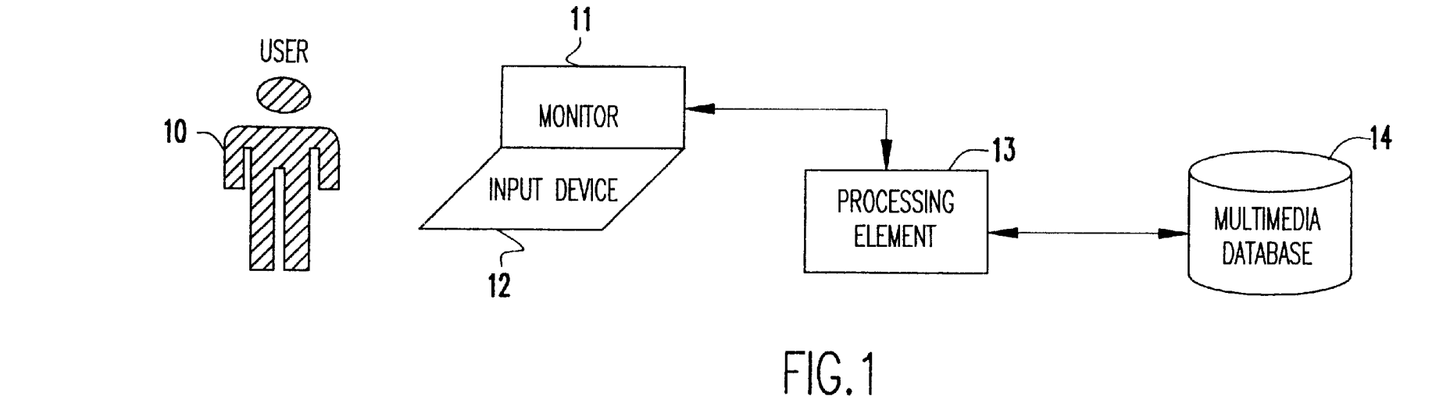
FIG. 1 is a block diagram illustrating apparatus on which the process according to the invention may be implemented.

Referring now to the drawings, a representative system on which the present invention may be implemented is shown in FIG. 1. A user 10 interacts via a monitor 11 and an input device 12, such as a keyboard and/or mouse, with a processing element 13. The processing element may be part of a computer system such as a personal computer or workstation, for example, which is programmed to perform the process according to the invention. The computer system typically includes memory and mass storage, such as a hard disk, as well as other supporting peripherals. The processing element 13 accesses multimedia database 14, typically stored on the mass storage of the computer system, in response to queries by the user 10.

Figure 2:
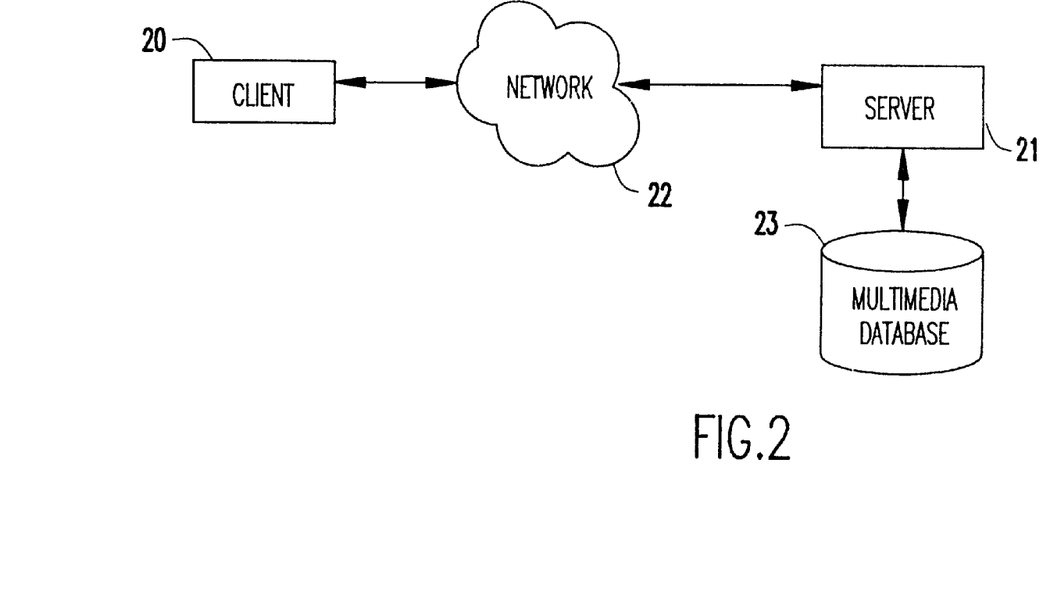
FIG. 2 is a block diagram illustrating another apparatus on which the process according to the invention may be implemented.

The computer system illustrated in FIG. 1 is a stand alone computer system, but the invention may be implemented on a networked computer system, an example of which is illustrated in FIG. 2. In this example, a client computer system 20 accesses a server 21 via a network 22. The network 22 may be a Local Area Network (LAN) or Wide Area Network (WAN), for example. Alternatively, the network 22 may be the Internet. The server 21 accesses a multimedia database 23 in response to queries received from the client computer system 20. The database 23 is typically stored on a mass storage system using magnetic or optical media.

Figure 3:
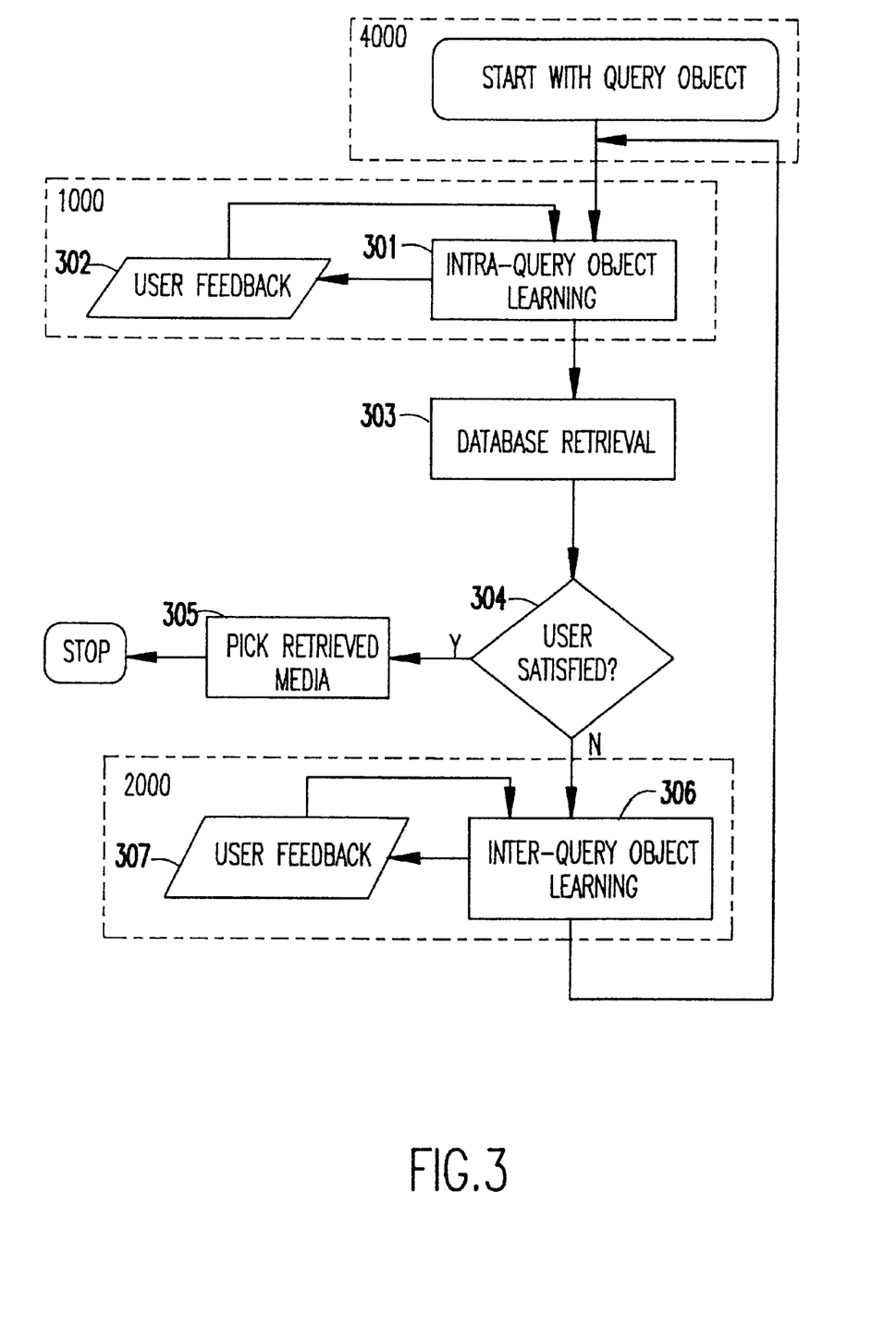
FIG. 3 is a flow diagram illustrating the logic of the process for the complete multimedia retrieval system with user feedback and learning according to the invention.

In the preferred embodiment of this invention, as illustrated in FIG. 3, the user starts the search process with the help of query object(s) in block 4000. The query object(s) may either be selected from a small database of query objects or may be supplied by the user. Alternatively, if the query object does not exist in the database and if the user does not have a representative query object, the user may then synthesize such a query using a pre-compiled dictionary as described later. The user's query is processed by an intra-query object processing block 1000. This processing block includes an intra-query object learning function 301 which receives user feedback 302, and is illustrated in more detail in FIG. 4. The output of the intra-object processing block 1000 is used by the computer to perform database retrieval in function block 303. The retrieved objects are displayed to the user who is prompted to indicate whether he or she is satisfied with the retrieval or not. The user's response to the prompt is evaluated in decision block 304. If the user is satisfied, the present query stops and the user picks, i.e., downloads or saves, from the set of data returned by the computer in block 305. Otherwise, the process enters the second learning loop, the inter-query object processing block 2000. The inter-query object processing block 2000 includes an interquery object learning function 306 which receives user feedback 307, just like the intra-query object processing block 1000. This second learning loop, i.e., inter-query object processing, is prior art and hence is not described in more detail.

The intra-query object processing performed in processing block 1000 consists of (a) specification of part(s) of interest by the user (i.e., user's interest is only in part of the query image or the user's interest is only in the vocals of an audio clip), (b) tentative over-segmentation of the query object (or part of it) using low-level features like color, texture, shape, audio frequency, motion, etc. (It could also include for example separation of audio signal into high and low pitch components. Various prior-art segmentation techniques can be applied in this context.), (c) merging or splitting of segments/regions specified by the user, (d) learning user's perception (e.g., color, texture, shape, topological and chronological arrangement of segments or relative importance of object motion in video or of varying frequency components in audio), and (e) extraction of semantic object(s) using such segments. Inter-query object processing comprises of (a) searching the database for similar query object(s) using learned parameters from intra-query object processing, (b) user's ranking of the retrieved media as relevant and irrelevant images, and (c) understanding user's perception to improve the retrieval efficiency for the next iteration of database retrieval.

Figure 4:
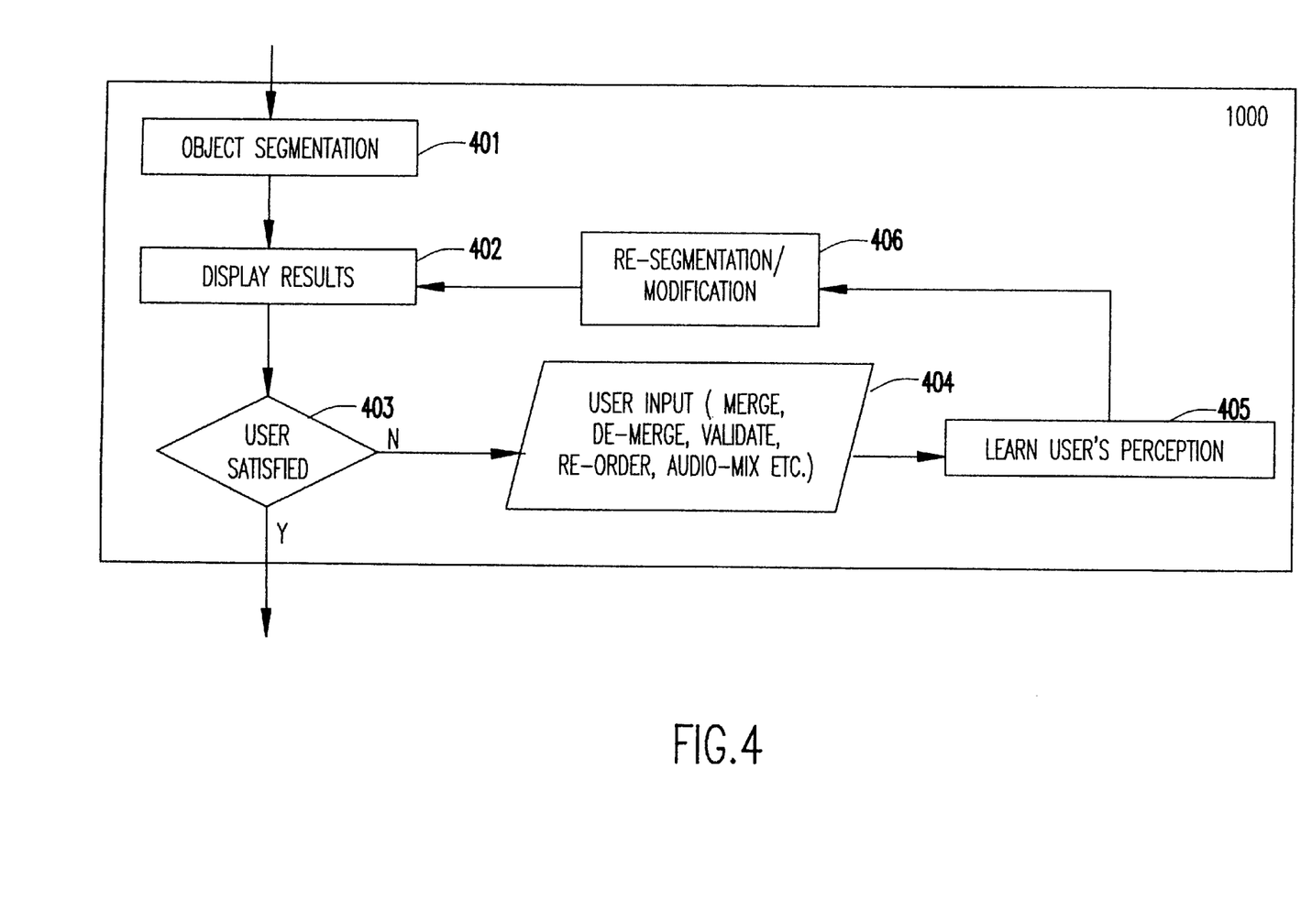
FIG. 4 is a flow diagram illustrating in more detail the first learning loop, i.e., intra-query object learning, of the process shown in FIG. 3.

The intra-query object processing of processing block 1000 is shown in more detail in FIG. 4. The first step in the process is media object segmentation performed in function block 401. Multimedia segmentation could imply image segmentation using low-level features like color, texture, etc. for images or audio segmentation into signals of various frequencies based on the pitch, or determination of video segmentation using motion vectors from the frames of a video clip. The segmentation results are displayed to the user in function block 402 with a prompt to indicate whether or not the user is satisfied with the segmentation results, at least in the region of interest. The user's input is evaluated in decision block 403, and if this input indicates that the user is not satisfied with the segmentation, then the user is prompted for further input, such as merge, de-merge, validate, re-order, audio mix, etc. This input is indicated by input block 404 and is used to learn the user's perception in function block 405. Based on the learned user perception, a re-segmentation of the media object is performed in function block 406. Alternatively, the block 406 could also modify the media object or a part of the object to better learn the user's perception, e.g., re-coloring an image, modifying the pitch to assess the user's sensitivity to such changes. The results of re-segmentation or modification are again displayed to the user at function block 402 and, again, the user is prompted to indicate his or her satisfaction. User's response is used to learn the perception; e.g., if color was changed and the user did not respond negatively, then the user cares more about texture and not color.

The query object is defined by a set of segments, each segment for an image being a homogeneous region of the image, in terms of gray-level value, RGB value, texture and/or a combination of these. In the case of video, it could include motion vectors that describe the motion of object pixels over the frames in the video sequence. A segment is characterized by a feature vector x, a shape description d, and a similarity measure for an image or video clip. The query object is characterized by a set of segments, their topological and chronological relationship G. The segmentation results are shown to the user. If the user is interested only in the partial query image, he or she selects areas of interest by enclosing them in a bounded polygon, for example. A subset of segments surrounding the user's areas of interest are shown to the user. Alternatively, segmentation is performed only in the area(s) of interest. The user is now allowed to merge two or more segments, e.g., by clicking on the edge between them or by clicking points inside the segments. This enables the computer to capture the users notion of similarity, topological and chronological relationship between different parts, and the user's area of interest in the query object. The user is also given an option of splitting a segment into two or more based on his perception, for example, by clicking on representative points in the segment. The computer now learns the model parameters and the similarity measures which would lead to merging or splitting of the selected segments. The re-grouped object is again shown to the user. This interactive process is repeated until the user is satisfied.

The present invention allows the user to create a composite object consisting essentially of two (or more) dissimilar segments, e.g., a flower and its stem. The two segments which are dissimilar are retained as separate segments and are added to query object set. The topological arrangements and features of individual segments along with learned similarity measures are used in subsequent database search. The similarity measures are adaptive quantities, which are adjusted with user's feedback. The measure could be different for different segments. Multimedia objects which contain the similar segments or a subset of segments and satisfy certain topological arrangement (if specified) are retrieved during inter-query object processing. In the case of video, the segmentation results might consist of an image frame along with motion vectors, e.g., a clip of a moving car might be shown as a single car with translational vector and rotational vectors for the tires. The user may then select the car and the corresponding motion vector to say that he or she is interested in a moving car. For the audio case, the computer might separate the vocals from the instrumentals based on pitch or percussion from a stringed instrument. The user may then select the desired sound effects.

Figure 5A:
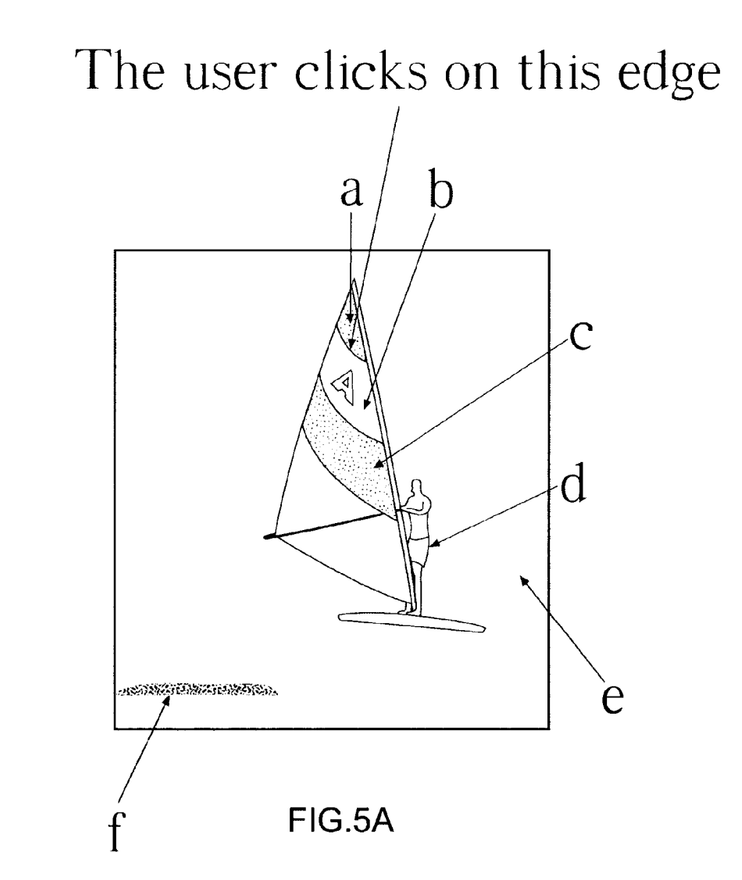
FIGS. 5A and 5B are illustrations of an image showing segmentation of the image in the practice of the invention.
Figure 5B:
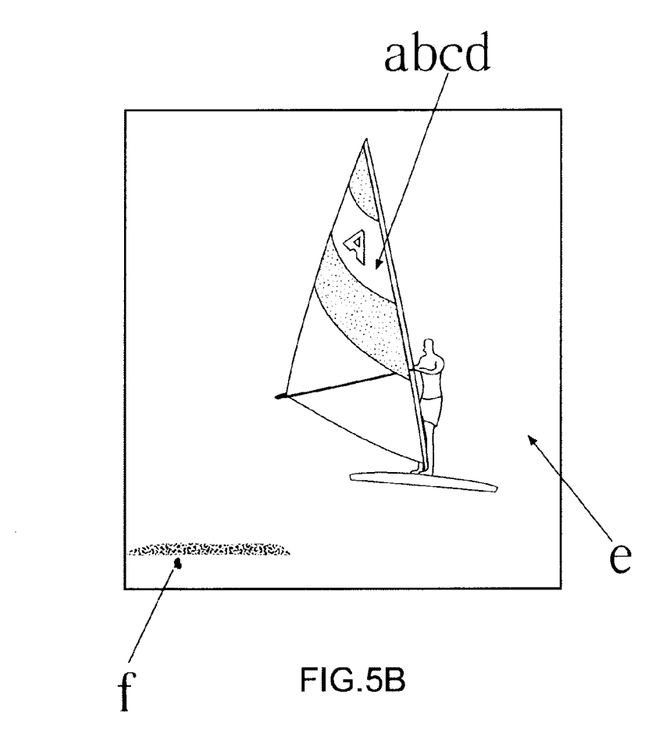

In the picture shown in FIG. 5A, the image is segmented into regions a, b, c, d, e and f. Segments a, b, c and d differ in color but are similar in texture. Segment a differs from segments e and f in texture. The user clicks on the edge joining segments a and b to merge these segments. The computer learns that user cares more about texture than color. The computer then groups the regions a, b, c and d together to make the query object. If now the user requests the search, the shape and the corresponding feature vector of only this segment abcd shown in FIG. 5B is used for searching the database.

It is possible that the set of initial query images is null. In that case, the system according to the invention enables the user to create an approximate query object from a textual query using a pre-compiled dictionary of objects. The drag and drop approach is a good candidate for query object synthesis. Textual phrases can also be used for specifying topological relationship of dictionary objects. Alternately, if the dictionary is large, the query can be formulated textually in terms of the dictionary objects and their topological relationships. The dictionary is augmented in run-time by letting the user add an object to the dictionary, every time he or she creates one in intra-object processing phase. Here the present invention is different from prior art techniques since the object in the present invention consists of the feature vector describing the region and a similarity measure f which will be used to measure the similarity of this segment to others. Thus, two segments with more or less the same feature vector could have different similarity measures, e.g., a homogeneous region made up of bricks in the shape of a cottage could either have a measure that says the shape matching is to be used to find cottages made up of either bricks or concrete or wood, or instead the measure could denote that the brick texture is to be used to find any brick region whether on the floor or wall, i.e., any shape. This is a different embodiment of this invention with the same objective of understanding the user's perception of the multimedia query object, achieved with synthesis and/or modification through user interaction.

Figure 6:
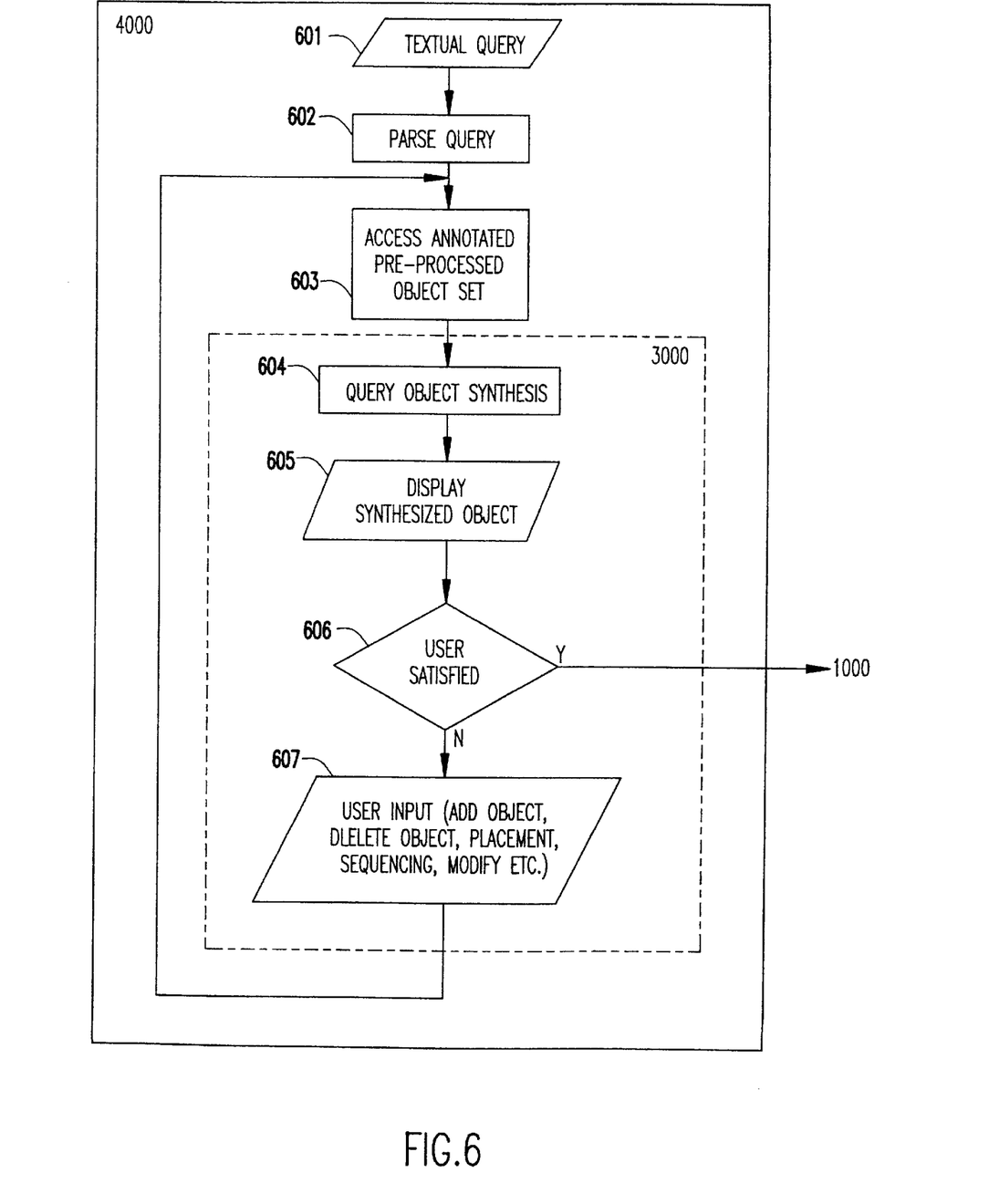
FIG. 6 is a flow diagram illustrating query object(s) synthesis from a textual query through user interaction using a pre-processed (i.e., pre-compiled) object set (i.e., dictionary of objects)

Query-object synthesis using a pre-processed (i.e., pre-compiled) object set (i.e., dictionary) of objects as described above is shown in FIG. 6, which describes in detail the block 4000 of FIG. 3. In this embodiment, the process could begin with a textual query, as shown in input block 601, that is first parsed in function block 602 and then categories are accessed from an "annotated" pre-processed object set, or dictionary, in function block 603. The object is then synthesized with user feedback for adding and/or deleting components or specifying the topological relationships between objects. This is performed in processing block 3000, the output of which is input to processing block 1000 in FIG. 3. More particularly, in processing block 3000, the object is synthesized in function block 604, and the synthesized query object is displayed in block 605 with a prompt for the user to input his or her satisfaction. The user input is evaluated in decision block 606, and if the user is not satisfied, the user is prompted to provide additional user input. This input is indicated at input block 607 and, once the input is entered, the process loops back to function block 603.

Figure 7:
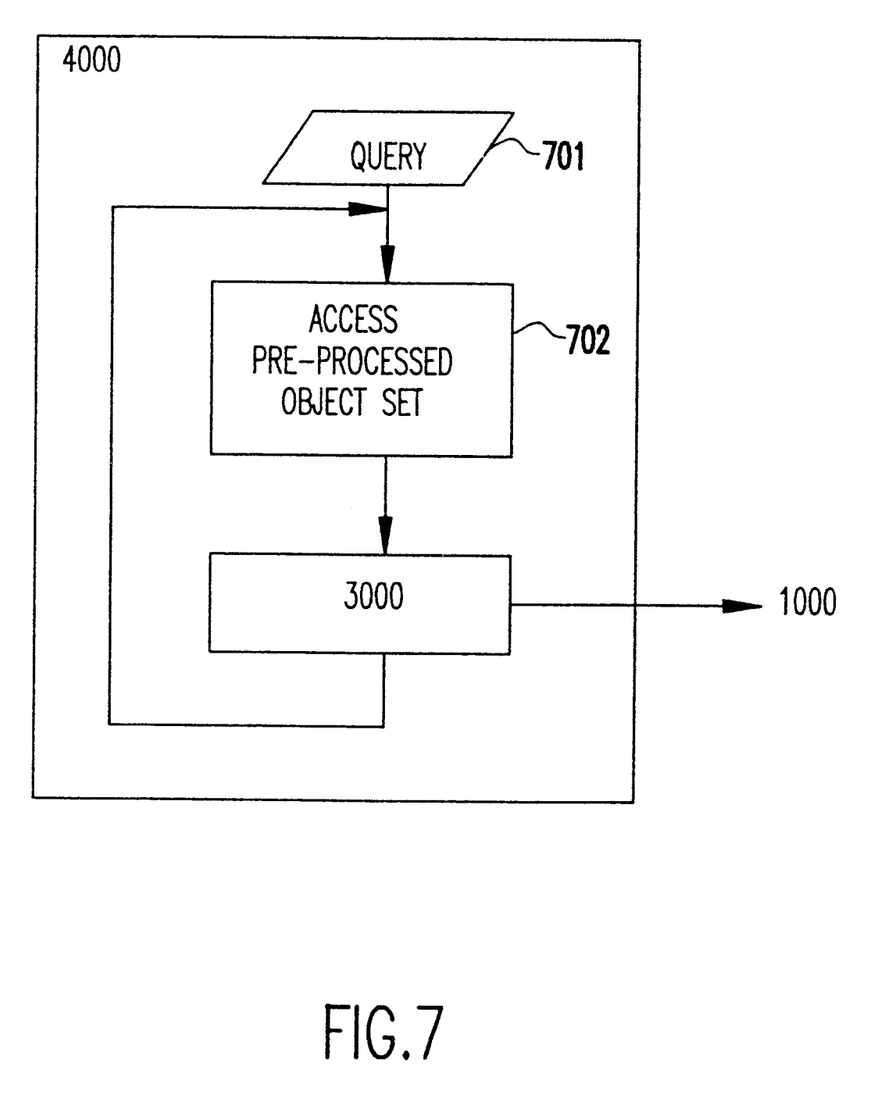
FIG. 7 is a flow diagram illustrating an alternative embodiment of FIG. 6, where a Graphic User Interface (GUI) is used for query object synthesis, instead of a textual query.

An alternative to this "object synthesis" approach could be just using a pre-processed object set (dictionary of objects); i.e., there is no annotation in the object set and, hence, the user may not browse the categories. This is shown in FIG. 7 where the query is input at input block 701, and in response to the query, the pre-processed object set is accessed in function block 702. At this point the process enters processing block 3000, as in FIG. 6. This is a simpler version as compared to that illustrated in FIG. 6. Consequently, the user may just drag-and-drop objects from the object set, but there is no textual query.

The present invention is different and more user-friendly from the prior art reported by T. P. Minka and R. W. Picard, "Interactive learning using a society of models", *Proc. IEEE CVPR*, 1996, where the user indicates a region of interest in the image itself by marking a number of pixels. This system generalizes by selecting and, if necessary, combining a number of pre-compiled grouping of highly specialized and context-dependent features from a "society of models" using a restricted set of rules.

Chad Carson, Serge Belongie, Hayit Greenspan, and Jitendra Malik in "Region-Based Image Querying", *CVPR'97 Workshop on Content-Based Access of Image and Video Libraries*, Puerto Rico, June 1997, also interpret the query image and show the segmented image to the user. The user can then select the segments of interest and in addition can manually assign weights to the different features. This is used to formulate the query and thus there is no notion of intra-image learning of the user's perception.

While the invention has been described in terms of a preferred embodiment and alternative embodiments, those skilled in the art will recognize that the invention can be practiced with modification within the spirit and scope of the appended claims.

Having thus described our invention, what we claim as new and desire to secure by Letters Patent is as follows:

1. A computer implemented method embodying an interactive framework for understanding a user's perception of multimedia data for the retrieval of data from a database comprising the steps of:

(a) receiving a user's specification of area(s) or portion(s) of interest as part of the user's query object, (b) tentatively over-segmenting at least a part of the query object, (c) merging or splitting of segments specified by the user, (d) learning the user's perception of area(s) or portion(s) of interest selected from the group consisting of color, texture, shape, time sequence, audio mixture, and topological arrangement of segments, and (e) extracting from the database semantic object(s) using the segments learned in said learning step.

2. The method according to claim 1, wherein the query object is defined by a set of segments characterized by at least one of a feature vector, a shape description, or a similarity measure.

3. The method according to claim 1, wherein the user's specification includes at least one of color, texture, shape, audio frequency, motion or region of interest of the query object.

4. The method according to claim 1, wherein the query object is over-segmented by at least one of color, texture, shape, audio frequency, or motion.

5. The computer implemented method of claim 1, wherein the step of inter-object processing comprises the steps of:
   (a) searching the database for similar query object(s) using learned parameters from intra-query object processing;
   (b) receiving the user's ranking of the retrieved objects as relevant or irrelevant data; and
   (c) understanding the user's perception.

6. A computer program product comprising a computer usable medium having computer readable program code embodied in the medium for embodying an interactive framework for understanding a user's perception of multimedia data for the retrieval of data from a database, the computer program product including:
   first computer program code for receiving a user's specification of area(s) or portion(s) of interest as part of the user's query object;
   second computer program code for tentatively over-segmenting at least a part of the query object;
   third computer program code for merging or splitting of segments specified by the user;
   fourth computer program code for learning the user's perception of area(s) or portion(s) of interest selected from the group consisting of color, texture, shape, time sequence, audio mixture, and topological arrangement of segments; and
   fifth computer program code for extracting from the database semantic object(s) using the segments learned by said fourth computer program.

7. A computer program product comprising according to claim 6, wherein the fifth computer program code comprises:
   sixth computer program code for searching the database for similar query object(s) using learned parameters from intra-query object processing;
   seventh computer program code for receiving the user's ranking of the retrieved objects as relevant or irrelevant data; and
   eighth computer program code for understanding the user's perception.

8. A system for embodying an interactive framework for understanding a user's perception of multimedia data for the retrieval of data from a database comprising:
   means for receiving a user's specification of area(s) or portion(s) of interest as part of the user's query object;
   means for tentatively over-segmenting at least a part of the query object;
   means for merging or splitting of segments specified by the user;
   means for learning the user's perception of area(s) or portion(s) of interest selected from the group consisting of color, texture, shape, time sequence, audio mixture, and topological arrangement of segments; and
   means for extracting from the database semantic object(s) using the segments learned by said learning means.

9. A system for embodying an interactive framework for understanding a user's perception of multimedia data for the retrieval of data from a database comprising according to claim 8, wherein the means for extracting comprises:
   (a) means for searching the database for similar query object(s) using learned parameters from intra-query object processing;
   (b) means for receiving the user's ranking of the retrieved objects as relevant or irrelevant data; and
   (c) means for understanding the user's perception.

* * * * *